US012182339B2

(12) United States Patent
Siu et al.

(10) Patent No.: US 12,182,339 B2
(45) Date of Patent: Dec. 31, 2024

(54) SUBTLE USER RECOGNITION

(71) Applicant: HOME CONTROL SINGAPORE PTE LTD, Singapore (SG)

(72) Inventors: Kwok Hoong Siu, Singapore (SG); Kyaw Zayar Han, Singapore (SG); Ching Guan Tay, Singapore (SG); Aloysius Choong, Singapore (SG); Chen Wee Cheah, Singapore (SG)

(73) Assignee: HOME CONTROL SINGAPORE PTE LTD, Singapore (SG)

( * ) Notice: Subject to any disclaimer, the term of this patent is extended or adjusted under 35 U.S.C. 154(b) by 0 days.

(21) Appl. No.: 16/638,130

(22) PCT Filed: Aug. 29, 2017

(86) PCT No.: PCT/SG2017/050426
§ 371 (c)(1),
(2) Date: Feb. 10, 2020

(87) PCT Pub. No.: WO2019/045639
PCT Pub. Date: Mar. 7, 2019

(65) Prior Publication Data
US 2020/0245014 A1 Jul. 30, 2020

(51) Int. Cl.
*H04N 21/21* (2011.01)
*G06F 3/02* (2006.01)
(Continued)

(52) U.S. Cl.
CPC .......... *G06F 3/021* (2013.01); *G06V 40/1335* (2022.01); *G06V 40/1353* (2022.01);
(Continued)

(58) Field of Classification Search
CPC ......... H04N 21/4126; H04N 21/41265; H04N 21/42222
(Continued)

(56) References Cited

U.S. PATENT DOCUMENTS 9,501,618 B1 * 11/2016 Wurst ................. G06F 21/6254
11,402,971 B1    8/2022 Mcnamara et al.
(Continued)

FOREIGN PATENT DOCUMENTS

CN    102907114 A    1/2013
CN    102984588 A    3/2013
(Continued)

OTHER PUBLICATIONS

International Search Report and Written Opinion issued in corresponding International Application No. PCT/SG2017/050426 on Nov. 2, 2017, eleven (11) pages.
(Continued)

*Primary Examiner* — Mushfikh I Alam
(74) *Attorney, Agent, or Firm* — Foley & Lardner LLP

(57) ABSTRACT

A remote controller unit is provided. The remote controller unit may include a navigation keypad area that includes one or more navigation keys. The one or more navigation keys may be configured to move a cursor on a display device associated to a computing device or select one or more user interface items on the display device. The remote controller unit may include a fingerprint input component arranged in the navigation keypad area. The fingerprint input component may be configured to capture a plurality of fingerprint frames of a user in response to the navigation keypad area being touched by the user to move the cursor or select the one or more user interface items on the display device. The fingerprint input component may be a fingerprint input transducer or sensor.

18 Claims, 12 Drawing Sheets

(51) Int. Cl.
  *G06V 40/12* (2022.01)
  *G06V 40/50* (2022.01)
  *H04N 21/41* (2011.01)
  *H04N 21/4415* (2011.01)
  *H04N 21/45* (2011.01)
  *H04N 21/475* (2011.01)
  *H04N 21/81* (2011.01)

(52) U.S. Cl.
  CPC .......... *G06V 40/1371* (2022.01); *G06V 40/50* (2022.01); *H04N 21/41265* (2020.08); *H04N 21/4415* (2013.01); *H04N 21/4532* (2013.01); *H04N 21/4753* (2013.01); *H04N 21/812* (2013.01)

(58) Field of Classification Search
  USPC .......................................................... 725/34
  See application file for complete search history.

(56) References Cited

U.S. PATENT DOCUMENTS

| | | | |
|---|---|---|---|
| 2003/0028872 A1* | 2/2003 | Milovanovic | H04L 63/0861 725/12 |
| 2006/0008129 A1* | 1/2006 | Lee | G06K 9/00033 382/124 |
| 2006/0080525 A1 | 4/2006 | Ritter et al. | |
| 2007/0079137 A1 | 4/2007 | Tu | |
| 2007/0094208 A1 | 4/2007 | Cerrato | |
| 2008/0212846 A1* | 9/2008 | Yamamoto | G06V 10/75 382/115 |
| 2010/0203973 A1* | 8/2010 | Muth | A63F 13/73 463/43 |
| 2010/0283916 A1 | 11/2010 | Yen et al. | |
| 2010/0332565 A1* | 12/2010 | Al-Shaykh | H04N 7/163 707/912 |
| 2011/0158486 A1* | 6/2011 | Bringer | G06K 9/001 382/125 |
| 2012/0044156 A1* | 2/2012 | Michaelis | G06F 3/03547 345/173 |
| 2012/0268241 A1* | 10/2012 | Hanna | G06F 21/32 340/5.52 |
| 2012/0291111 A1 | 11/2012 | Kamakura | |
| 2013/0031117 A1* | 1/2013 | Mandelstein | G06F 16/214 707/758 |
| 2013/0138652 A1 | 5/2013 | Bigdeli et al. | |
| 2013/0272586 A1 | 10/2013 | Russo | |
| 2014/0003717 A1* | 1/2014 | Brito | G06V 30/412 382/218 |
| 2014/0314283 A1 | 10/2014 | Harding | |
| 2015/0143394 A1* | 5/2015 | Hijikata | H04N 21/44222 725/14 |
| 2016/0072819 A1* | 3/2016 | Chen | G06F 21/32 726/4 |
| 2016/0087957 A1* | 3/2016 | Shah | H04L 63/08 726/1 |
| 2016/0164866 A1* | 6/2016 | Oberheide | H04L 63/0853 726/1 |
| 2016/0247013 A1* | 8/2016 | Johansson | G06V 40/1365 |
| 2017/0192465 A1 | 7/2017 | Lazaridis et al. | |
| 2017/0200039 A1* | 7/2017 | Wright | G06K 9/00926 |
| 2017/0332031 A1* | 11/2017 | Park | H04N 21/4667 |
| 2018/0032792 A1* | 2/2018 | Wang | G06V 40/1365 |
| 2018/0068399 A1* | 3/2018 | Feinberg | G06Q 50/14 |
| 2018/0205725 A1* | 7/2018 | Cronkright | H04L 9/0637 |
| 2019/0026453 A1* | 1/2019 | Choi | H04L 9/3231 |

FOREIGN PATENT DOCUMENTS

| | | |
|---|---|---|
| CN | 103369391 A | 10/2013 |
| CN | 103559487 A | 2/2014 |
| CN | 105959749 A | 9/2016 |
| CN | 105959762 A | 9/2016 |
| CN | 106030599 A | 10/2016 |
| CN | 106257926 A | 12/2016 |
| CN | 106650569 A | 5/2017 |
| CN | 106911963 A | 6/2017 |
| CN | 108053844 A | 5/2018 |
| CN | 1322439 A | 11/2021 |
| DE | 10117765 A1 | 10/2002 |
| EP | 2 579 608 A1 | 4/2013 |
| JP | 2000-163572 A | 6/2000 |
| JP | 2001-128253 A | 5/2001 |
| JP | 2008-193258 A | 8/2008 |
| JP | 2010-087596 A | 4/2010 |
| JP | 2011-223573 A | 11/2011 |
| JP | 2013-505674 A | 2/2013 |
| KR | 20120045847 A | 5/2012 |
| KR | 10-2015-0034832 A | 4/2015 |
| KR | 20160004363 A | 1/2016 |
| KR | 10-2017-0042291 A | 4/2017 |
| TW | 201421397 A | 6/2014 |
| TW | 201546645 A | 12/2015 |
| WO | WO 01/24524 A1 | 4/2001 |
| WO | WO-2011/037761 A1 | 3/2011 |
| WO | WO 2017/096767 A1 | 6/2017 |
| WO | WO-2017/113380 A1 | 7/2017 |

OTHER PUBLICATIONS

International Preliminary Report on Patentability issued in corresponding International Application No. PCT/SB2017/050426, dated Jun. 6, 2019.
Office Action issued in Japanese patent application No. 2020-512590 on Jun. 22, 2021.
Office Action issued in Korean Patent Application No. 10-2020-7009154 on Jul. 19, 2021.
Written Opinion issued in Korean Patent Application No. 10-2020-7009154 on Sep. 16, 2021.
Examination Report issued in co-pending India Patent Application No. 202017013652, dated Mar. 14, 2022.
Non-Final Office Action issued in co-pending U.S. Appl. No. 16/642,800, dated Mar. 7, 2022.
Non-Final Rejection issued in Taiwan Patent Application No. 107129479, dated Mar. 4, 2022.
Non-Final Rejection issued in Taiwan Patent Application No. 107130146, dated Apr. 15, 2022.
Final Office Action issued in co-pending U.S. Appl. No. 16/642,800, dated Jun. 14, 2022.
Official Action issued in European Patent Application No. 17768263.0, dated Dec. 19, 2022.
Office Action issued in Chinese Patent Application No. 201780094526.2, dated Jan. 20, 2023.
Office Action and Search Report issued in Taiwan Patent Application No. 107130146, dated Feb. 20, 2023.
Office Action issued in China Patent Application No. 201880056232.5, dated Jan. 30, 2023.
Final Office Action issued in co-pending U.S. Appl. No. 16/642,800, dated Mar. 30, 2023.
Notice of Allowance issued in co-pending U.S. Appl. No. 16/642,800, dated Jul. 3, 2023.
Office Action issued in co-pending U.S. Appl. No. 16/642,800, dated Dec. 8, 2022.
Request for the Submission of an Opinion issued in co-pending Korea Patent Application No. 10-2020-7009233, dated Nov. 8, 2022, 10 pages.

* cited by examiner

FIG. 6A Swipe sensor

FIG. 6B Press sensor

SUBTLE USER RECOGNITION

CROSS-REFERENCE TO RELATED APPLICATION

This application is the U.S. National Stage of International Patent Application No. PCT/SG2017/050426, filed Aug. 29, 2017. The contents of this application is incorporated herein by reference in its entirety.

TECHNICAL FIELD

Various aspects of this disclosure generally relate to human-computer interaction, and more particularly, to user recognition without needing the user to perform any intentional step.

BACKGROUND

With more and more content available in the World Wide Web and digital media players, the volume of infotainment content can easily overwhelm a user wishing to locate items of interest. Personalization techniques are developing to "understand" a user's need for specific types of infotainment and provide recommendation accordingly. Any recommendation service for this purpose needs to identify a user before recommendations can be made for the user. One way to identify a user is using a fingerprint input transducer or sensor to accept unique biometric information from the user. This requires a user to knowingly "register" herself by pressing her finger against a flat surface more than one time. This "hard-selling" tactic may not sit well with some users, unless those users see the benefits in doing so. Further or alternatively, users may get frustrated having to repeat registration for multiple times when the system fails to register due to poor fingerprint capturing. Therefore, it might be desirable to achieve user recognition without needing a user to knowingly perform any action to achieve such user recognition (hereinafter referred to as "perform an intentional step").

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

This disclosure describes a system and a method of achieving user recognition without needing the user to perform an intentional step. This disclosure also describes a subtle way of capturing unique biometric information using a fingerprint sensor on a handheld device, e.g., a remote controller unit (RCU).

In an aspect of the disclosure, a remote controller unit is provided. The remote controller unit may include a navigation keypad area that includes one or more navigation keys. The one or more navigation keys may be configured to move a cursor on a display device associated to a computing device or select one or more user interface (UI) items on the display device. The remote controller unit may include a fingerprint input component arranged in the navigation keypad area. The fingerprint input component may be configured to capture a plurality of fingerprint frames of a user in response to the one or more navigation keys being touched by the user to move the cursor or select the one or more UI items on the display device. The fingerprint input component may be a fingerprint input transducer or sensor.

In another aspect of the disclosure, a method of user recognition is provided. The method may receive at least one finger touch from a user at a navigation keypad area of a remote controller unit to move a cursor on a display device associated to a computing device or select one or more UI items on the display device. The navigation keypad area may include one or more navigation keys configured to move the cursor or select the one or more UI items on the display device. The method may capture a plurality of fingerprint frames of the user in response to the receiving of the at least one finger touch. The method may transmit the plurality of fingerprint frames to a mobile device of the user or the computing device. The method may extract a plurality of fingerprint features from the plurality of fingerprint frames.

In yet another aspect of the disclosure, a method, a computer readable medium, and an apparatus for user recognition are provided. The apparatus may receive a broadcast message from a mobile device. The broadcast message may include an identity of a user operating the mobile device. The apparatus may determine whether the mobile device is in close proximity to the apparatus. The apparatus may extract the identity of the user from the broadcast message when the mobile device is in close proximity to the apparatus.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
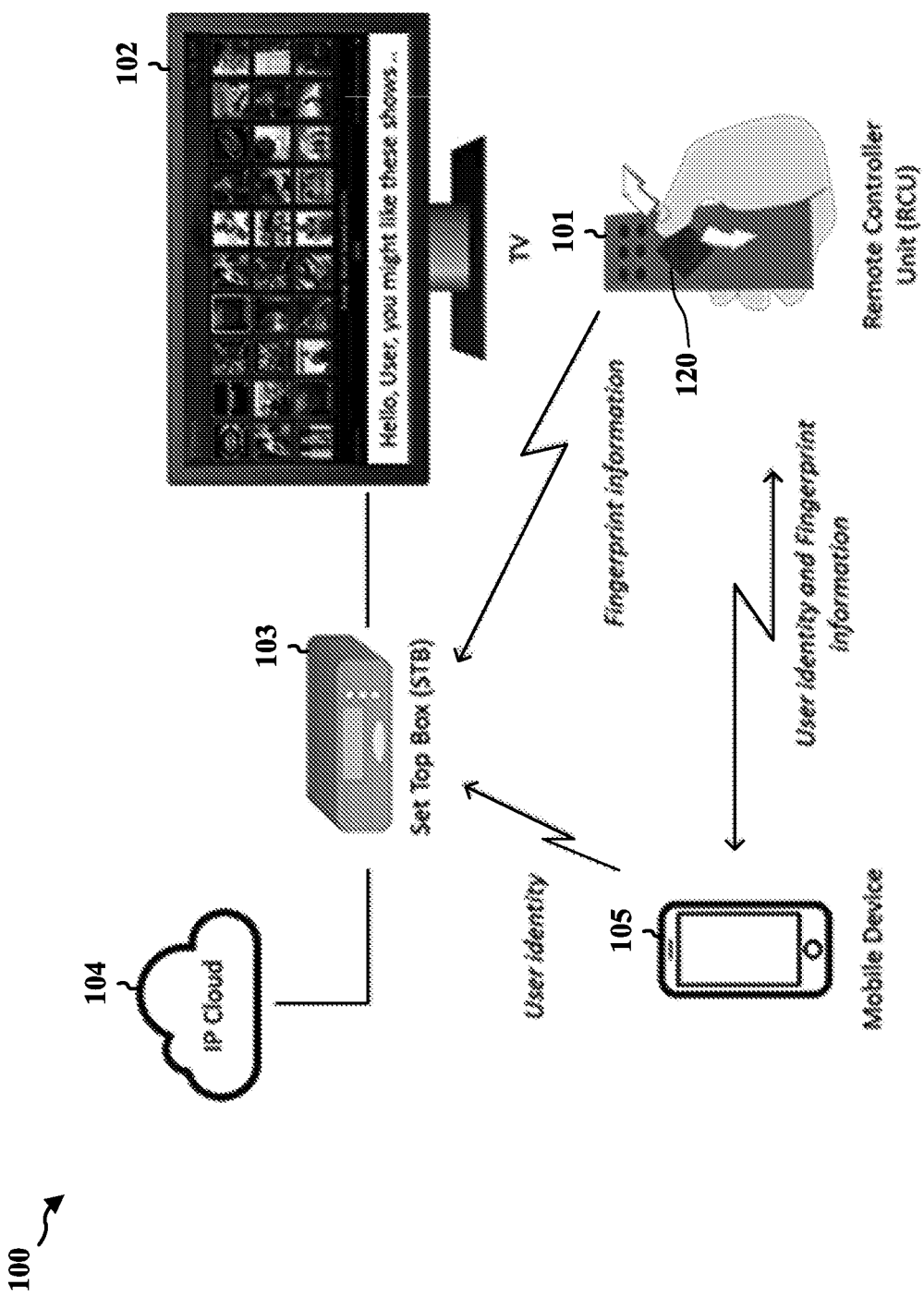
FIG. 1 is a diagram illustrating an example of a system for achieving user recognition without needing the user to perform any intentional step.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of user recognition will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

This disclosure describes a system and a method of achieving user recognition without needing the user to perform an intentional step. This disclosure also describes a subtle way of capturing unique biometric information using fingerprint sensor on handheld device, e.g. remote controller unit.

In one example, two persons (e.g., Mike and Mary) are in the living room watching TV. In one embodiment, when either of them is using the RCU to navigate the TV content, the TV system may know that both Mike and Mary are in the room together. In one embodiment, when Mike is using the RCU, the TV system may know that Mike is watching the contents presented by the TV system. Likewise, when Mary is using the RCU, the TV system may know that Mary is watching the contents presented by the TV system. The TV system may be a connected smart TV, or a regular TV with a connected set-top box (STB), or an over-the-top content (OTT) box, or a media streaming stick and so on. The TV system may be coupled to a RCU. There may be a radio frequency (RF) communication link between the TV system and the RCU. The RF communication link may utilize Wi-Fi, Bluetooth, Zigbee, or any other suitable short-range communication protocol.

In one embodiment, while navigating with the RCU during TV watching, user recognition may be achieved without needing the user to perform any intentional step. Recognizing the user may allow the service provider to start tracking the user's usage habits and profiles, in turn to generate meaningful services like targeted content, advertisement etc.

In the example before, Mike may like science fiction (Sci-Fi) contents, Mary may like drama contents. When Mike is alone watching TV, the TV system may recommend the latest Sci-Fi contents and perhaps Sci-Fi related contents. When both Mike and Mary are together, the TV system may recommend drama with some Sci-Fi elements.

Nowadays people have mobile devices with them (or within close proximity) wherever they go and at home. Examples of mobile devices are smart phones, tablets, phablets, connected wearables, and so on. These mobile devices have RF communication capability.

An RCU may have a navigation area, usually the Arrow-OK keys and/or touchpad enabled surface for swiping or clicking. Through pressing the navigation keys, or swiping the navigation surface, a user may control the TV system on a screen user interface, e.g., browse the menu, content, and playback.

In one embodiment, an application software may be installed in a mobile device, and a corresponding software may be installed in the TV system, and a corresponding software may be installed in the RCU. The application software in the mobile device may have the identity of mobile device owner. The application software and corresponding software in the TV system may allow the identity information and messages from the mobile device to be shared with the TV system. The application software and corresponding software in the TV system may also allow information (e.g., contents being watched) to be transmitted from the TV system to the mobile device. The application software in the mobile device and the corresponding software in the RCU may allow identity information to be transmitted from the mobile device to the RCU, and fingerprint information to be transmitted from the RCU to the mobile device.

In one embodiment, there may be a sensor beneath the RCU navigation area. The sensor may be a fingerprint sensor like those in a mobile device or on a notebook computer. When a user's finger moves over the navigation area, this sensor may track the fingerprint biometric information/features of the user. The RCU may then transmit the fingerprint information to the TV systems and/or to mobile devices.

In the example described above, Mike and Mary may both have their respective mobile devices with them while watching TV together in the room. When the RCU is used by either Mike or Mary, the RCU and/or the TV system may detect the presence of both mobile devices with their respective identities. When the RCU is used by Mike, the RCU sensor may track and send Mike's fingerprint to the TV system regularly. Likewise, when the RCU is used by Mary, the RCU sensor may track and send Mary's fingerprint to the TV system regularly.

In one embodiment, the TV system may use fingerprint application (locally or cloud based) to detect the fingerprint biometric information/features over a period of time. The fingerprint application may have smart algorithm that associates or matches the biometric features with user viewing habits and profiles, and deriving a series of meaningful services subsequently.

FIG. 1 is a diagram illustrating an example of a system 100 for achieving user recognition without needing the user to perform any intentional step. In the example, the system 100 may include a mobile device 105, an RCU 101, and a TV system include a TV 102 and a set-top box (STB) 103. The system 100 may also include an application software in the mobile device 105, a corresponding software in the TV system (e.g., the STB 103), and a corresponding software in the RCU 101.

The application software in the mobile device 105 may be downloaded from a cloud based server. The application software may get the identity of the user in various ways, e.g. name entry or email sign-in. In one embodiment, the application software may start by requesting the user to key in his/her name. This name field may be bind with a unique address of the mobile device 105 (e.g. MAC address) and/or device name. The purpose of the application software in the mobile device 105 may be to ensure that the mobile device 105 is in discoverable mode. For example, the mobile device 105 may broadcast its RF signature (e.g., device name and user's identity) periodically.

The corresponding software in the STB 103 may pick up broadcasted RF signature from the mobile device 105 and extract the user's identity if the mobile device 105 is in close proximity to the TV system (e.g., less than a threshold distance). This may allow software residing in the STB 103 to associate the user's identity with the content being watched on the TV 102, which may have tremendous value to the service provider.

In one embodiment, the proximity of the mobile device 105 to the TV system may be determined based on the signal strength of the RF signature received from the mobile device 105 at the STB 103 or the RCU 101. In one embodiment, if the measured signal strength of the RF signature from the mobile device 105 is above a threshold, the mobile device 105 is determined to be in close proximity to the TV system.

In one embodiment, the signal strength of the RF signature may be measured by the received signal strength indicator (RSSI).

There may be a fingerprint sensor beneath a navigation area 120 of the RCU 101. The fingerprint sensor may be a swipe sensor or a press sensor like those in a notebook computer or a mobile device. When a user's finger moves over the navigation area 120, the sensor may track the fingerprint biometric features of the user. The RCU 101 may then transmit the fingerprint information to the TV systems (e.g., the STB 103) and/or to the mobile device 105. The corresponding software in the RCU 101 may pick up broadcasted RF signature from the mobile device 105 and extract the user's identity. The RCU 101 may associate the fingerprint information with the user's identity.

The TV system may have a fingerprint application (locally at the STB 103 or cloud based at a cloud based server 104) that detects the fingerprint biometric information/features over a period of time. The fingerprint application may have smart algorithm that associates or matches the biometric features with viewing habits and profiles, from there deriving a series of meaningful services subsequently.

Figure 2:
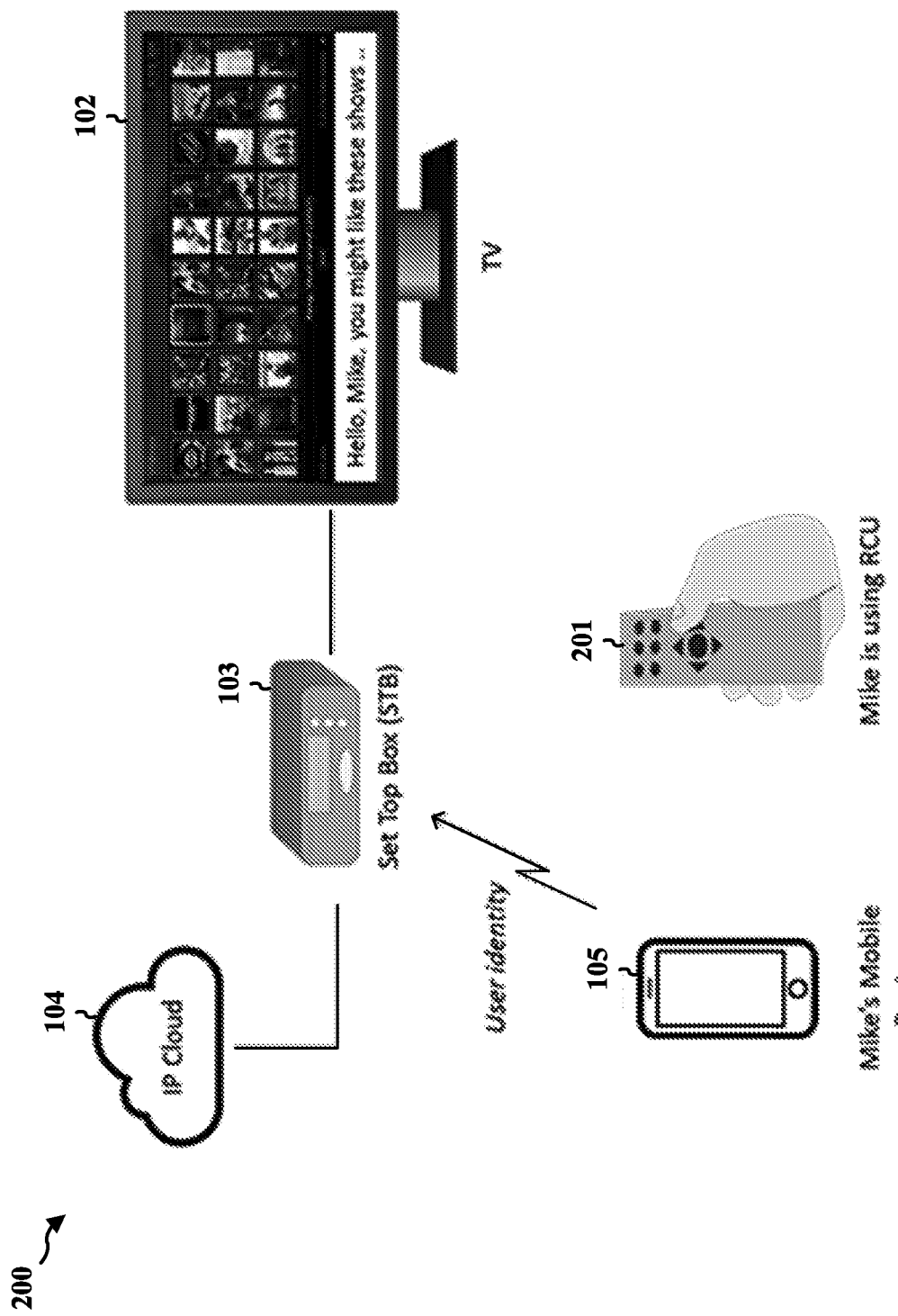
FIG. 2 is a diagram illustrating an example of a system for achieving user recognition with a conventional remote controller unit without fingerprint sensor.

FIG. 2 is a diagram illustrating an example of a system 200 for achieving user recognition with a conventional remote controller unit 201 without fingerprint sensor. In the example, the system 200 may include a mobile device 105, an RCU 201, and a TV system include a TV 102 and an STB 103.

The application software in the mobile device 105 may be downloaded from a cloud based server. The application software may get the identity of the user in various ways, e.g. name entry or email sign-in. In one embodiment, the application software may start by requesting the user to key in his/her name. This name field may be bind with a unique address of the mobile device 105 (e.g. MAC address) and/or device name. The purpose of the application software in the mobile device 105 may be to ensure that the mobile device 105 is in discoverable mode. For example, the mobile device 105 may broadcast its RF signature (e.g., device name and user's identity) periodically.

The RCU 201 does not include a fingerprint sensor. Thus no fingerprint information can be detected by the RCU 201. The corresponding software in the STB 103 may pick up broadcasted RF signature from the mobile device 105 and extract the user's identity if the mobile device 105 is in close proximity to the TV system (e.g., less than a threshold distance). This may allow software residing in the STB 103 to associate the user's identity with the content being watched on the TV 102, which may have tremendous value to the service provider. The TV system may have an application (locally at the STB 103 or cloud based at a cloud based server 104) that retrieves viewing habits and profiles based on the user's identity, deriving a series of meaningful services subsequently.

In one embodiment, the proximity of the mobile device 105 to the TV system may be determined based on the signal strength of the RF signature received from the mobile device 105 at the STB 103 or the RCU 201. In one embodiment, if the measured signal strength of the RF signature from the mobile device 105 is above a threshold, the mobile device 105 is determined to be in close proximity to the TV system. In one embodiment, the signal strength of the RF signature may be measured by the received signal strength indicator (RSSI).

Figure 3:
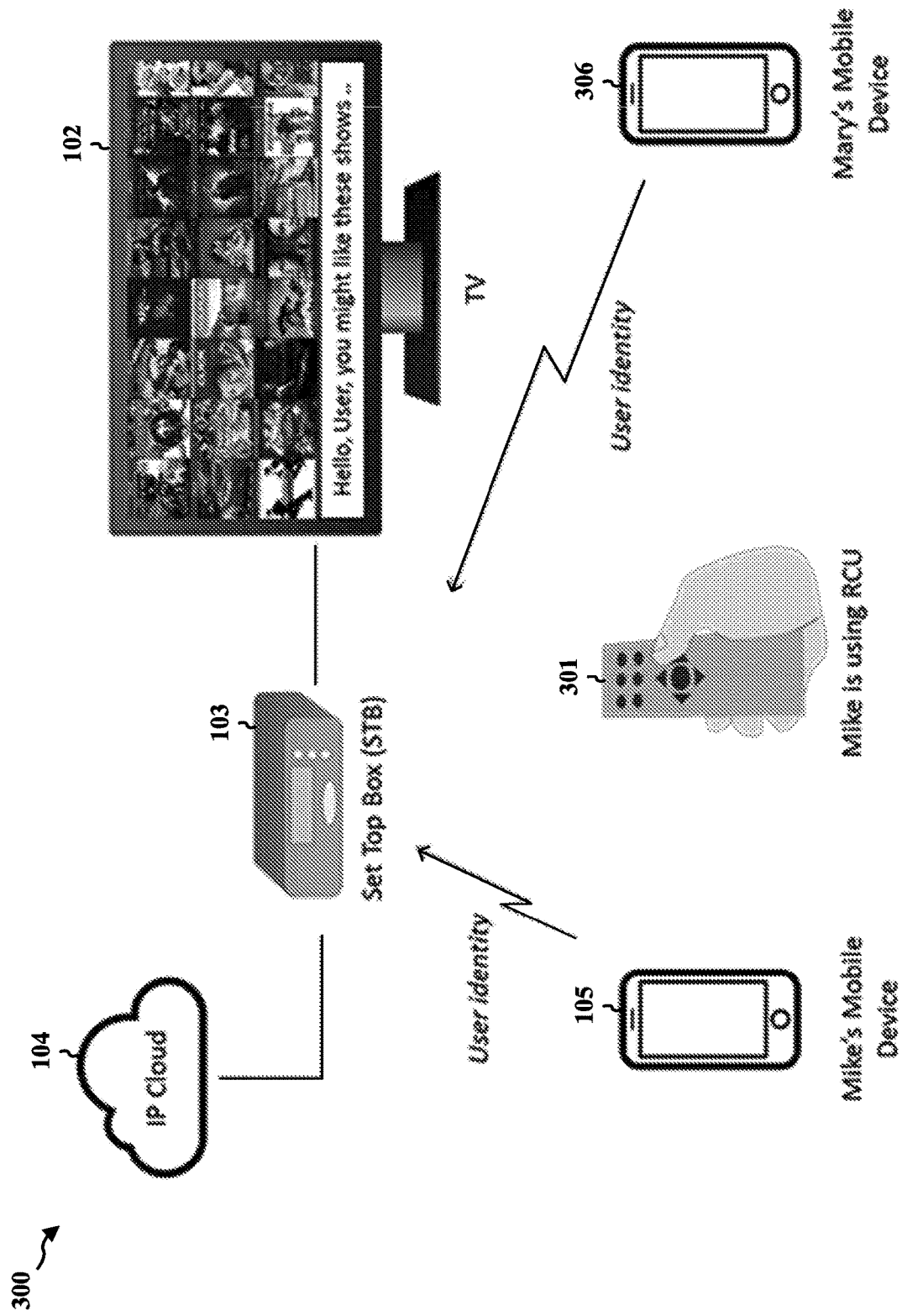
FIG. 3 is a diagram illustrating an example of a system in which more than one user and/or mobile device are in close vicinity (e.g., in the same room).

FIG. 3 is a diagram illustrating an example of a system 300 in which more than one user and/or mobile device are in close vicinity (e.g., in the same room). In the example, the system 300 may include mobile devices 105, 306, an RCU 301, and a TV system include a TV 102 and an STB 103. The mobile devices 105 and 306 may have application software installed.

The application software in the mobile devices 105 and 306 may be downloaded from a cloud based server. The application software may get the identity of the user in various ways, e.g. name entry or email sign-in. In one embodiment, the application software may start by requesting the user to key in his/her name. This name field may be bind with a unique address of the mobile device 105 or 306 (e.g. MAC address) and/or device name. The purpose of the application software in the mobile devices 105 and 306 may be to ensure that the mobile devices 105 and 306 are in discoverable mode. For example, the mobile device 105 or 306 may broadcast its RF signature (e.g., device name and user's identity) periodically.

The RCU 301 may include a fingerprint sensor that may identify a user who is operating the RCU 301. The corresponding software in the STB 103 may pick up broadcasted RF signature from the mobile devices 105 and 306, and extract the users' identities if the mobiles devices 105 and 306 are in close proximity to the TV system (e.g., less than a threshold distance). This may allow software residing in the STB 103 to realize that more than one persons may be watching the contents displayed on the TV 102, even though only one of them is operating the RCU 301. The system 300 may adopt a neutral approach to be unbiased towards any user's preference. As a result, the STB 103 may recommend a wider content genres. In the background, there may exist an algorithm (locally at the STB 103 or cloud based at a cloud based server 104) to analyze and profile each user's preference.

In one embodiment, the proximity of the mobile device 105 or 306 to the TV system may be determined based on the signal strength of the RF signature received from the mobile device at the STB 103 or the RCU 301. In one embodiment, if the measured signal strength of the RF signature from the mobile device 105 or 306 is above a threshold, the respective mobile device is determined to be in close proximity to the TV system. In one embodiment, the signal strength of the RF signature may be measured by the received signal strength indicator (RSSI).

In one embodiment, an RCU with fingerprint sensor may be provided. In one embodiment, a TV system and/or mobile device may process fingerprints detected by the RCU.

Figure 4:
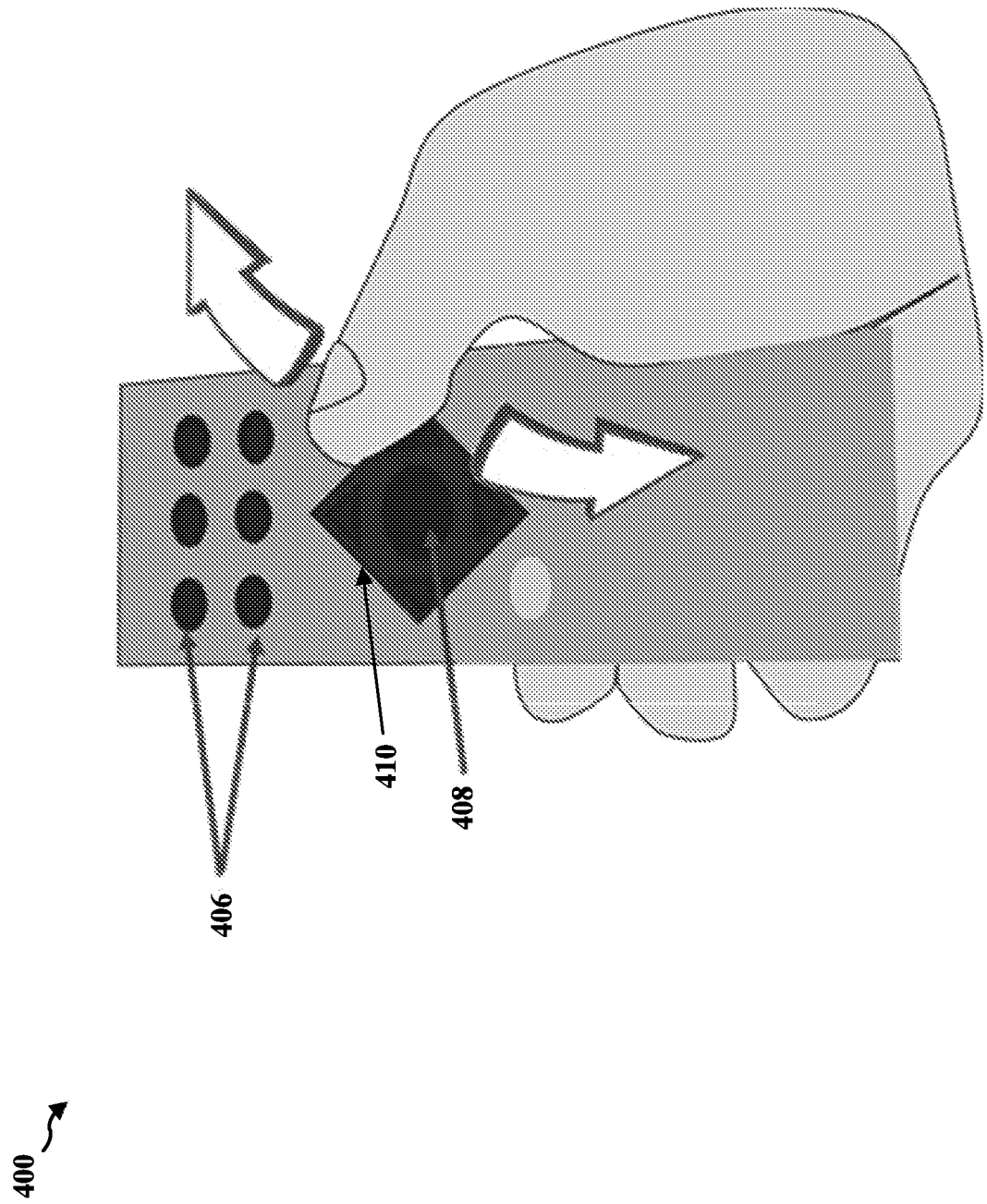
FIG. 4 is a diagram illustrating an example of a remote controller unit that has a fingerprint sensor built into the navigation keypad area.

FIG. 4 is a diagram illustrating an example of an RCU 400 that has a fingerprint sensor 408 built into the navigation keypad area 410. In the example, the RCU 400 may have several buttons 406 and a navigation keypad area 410, where navigation keys are located. In one embodiment, the RCU 400 may be the RCU 101 described above with reference to FIG. 1.

In one embodiment, the navigation keys may include four directional/arrow keys and OK/ENTER button in center. The navigation keys may be pressed to move a displayed cursor or select a displayed UI item. The OK/ENTER button may be the most frequently pressed. In one embodiment, the fingerprint sensor 408 may be place under a surface area corresponding to the navigation keypad area 410. In one embodiment, the fingerprint sensor 408 may be implemented on the OK/ENTER button. In one embodiment, the fingerprint sensor 408 may be a swipe sensor in between navigation keys to detect fingerprint during swiping actions when user moves his finger across the keys.

Figure 5:
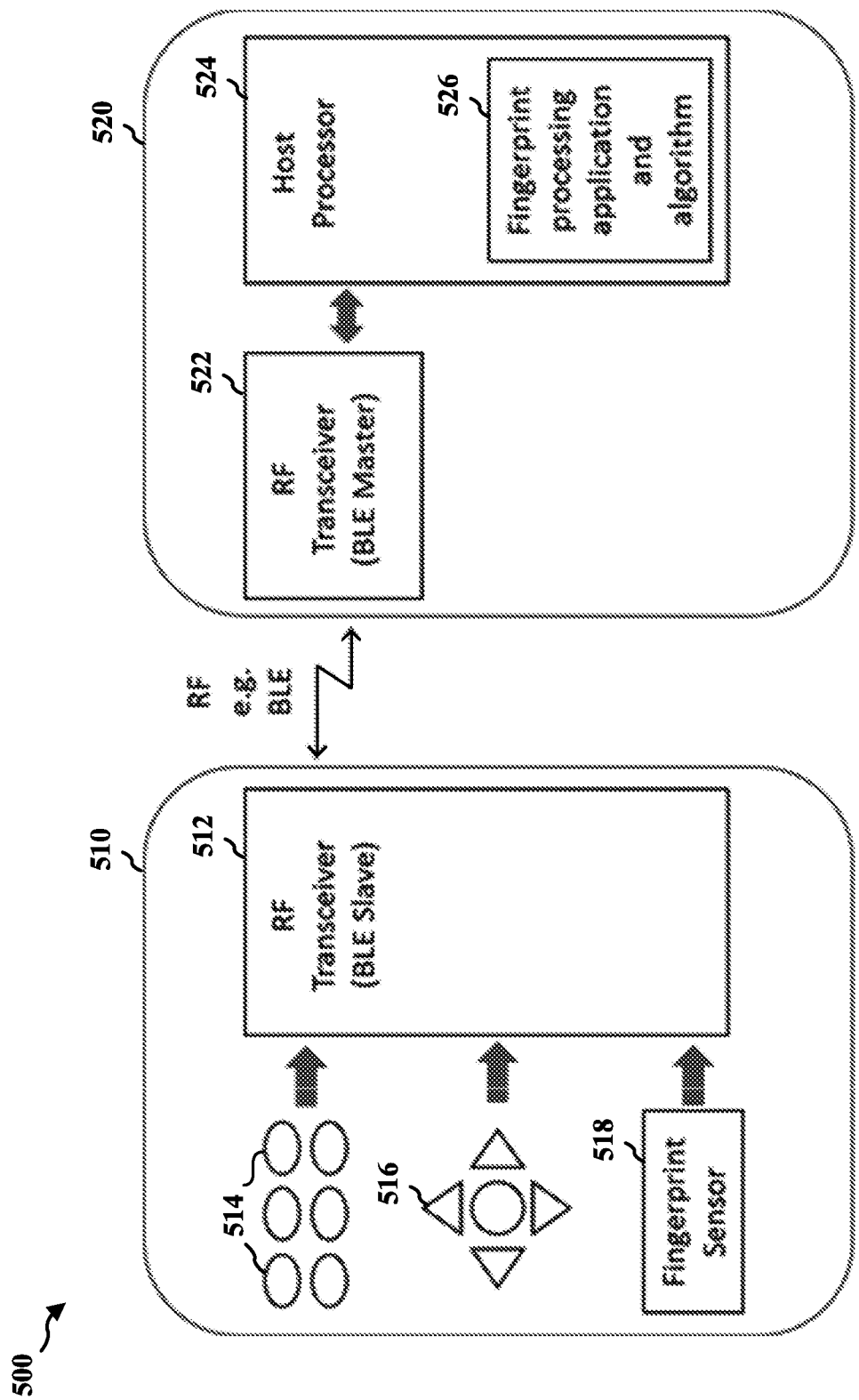
FIG. 5 is a block diagram illustrating an example of a remote controller unit communicating with a set-top box via a radio frequency link.

FIG. 5 is a block diagram 500 illustrating an example of a remote controller unit 510 communicating with a set-top box 520 via a radio frequency link. The RF link between the RCU 510 and the STB 520 may use Bluetooth Low Energy (BLE) or any other suitable short-range wireless communication protocol. The STB 520 in this conjunction is the host/master. It is understood that a connected smart TV can be the host/master as well. In the example, the RCU 510 may include several buttons 514, a navigation keypad 516, a fingerprint sensor 518, and a RF transceiver 512. The RF transceiver 512 may receive input information from the buttons 514 and the keypad 516, and fingerprint information from the fingerprint sensor 518 and transmit these information to the STB 520. In one embodiment, the RCU 510 may be the RCU 101 or 400 described above.

The STB 520 may include a host processor 524 and an RF transceiver 522. The RF transceiver 522 may communicate with the RF transceiver 512 of the RCU 510 to receive input information and fingerprint information. The host processor 524 may include a fingerprint processing application/algorithm 526 that processes the received fingerprint information. In one embodiment, the STB 520 may be the STB 103 described above with reference to FIG. 1.

Figure 6:
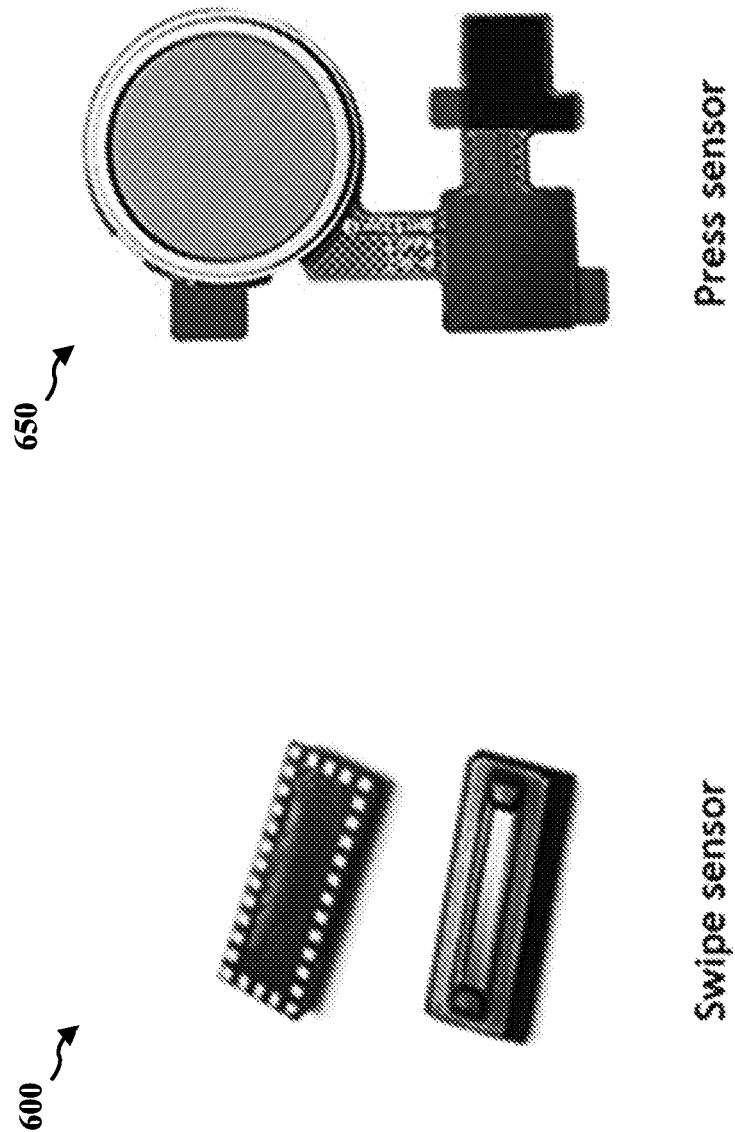
FIG. 6A is a diagram illustrating an example of a swipe sensor that may be used as a fingerprint sensor.
FIG. 6B is a diagram illustrating an example of a press sensor that may be used as a fingerprint sensor.

FIG. 6A is a diagram illustrating an example of a swipe sensor 600 that may be used as a fingerprint sensor. In one embodiment, the swipe sensor 600 may be a CMOS swipe sensor with an active sensing area of 6.4 mm×0.4 mm achieving 508 dpi pixel array. The swipe sensor 600 may be mounted and camouflaged in the navigation keypad area (e.g., the navigation keypad area 410) of an RCU (e.g., the RCU 101, 400, or 510). In one embodiment, single image capturing during swipe action may use 1024 bytes per frame. Continuous frames, e.g., 20 frames, may be captured during a single brief swiping to allow better image processing. The data per frame in this example may be 8 kbps, is of low bit rate and can be transmitted over low bandwidth RF such as BLE.

FIG. 6B is a diagram illustrating an example of a press sensor 650 that may be used as a fingerprint sensor. In one embodiment, the round shape of the press sensor 650 may camouflage well with OK button in the center of a navigation keypad area (e.g., the navigation keypad area 410) of an RCU (e.g., the RCU 400 or 101). Other shapes, like square and rounded rectangular, may be available as well in other embodiments. In one embodiment, the press sensor 650 may be a CMOS sensor found commonly on smartphone for unlocking the phone. In one embodiment, the press sensor 650 may capture fingerprint images even the finger is briefly on the sensor when the finger moves over the navigation keypad. It may be as brief as 200 msec. In one embodiment, each captured image may use several bytes (e.g., 512 bytes), depending on the size of the press sensor 650. This image capturing for a brief moment allows a subtle way of capturing unique biometric information of user's fingerprint. In one embodiment, fingerprint sensor (e.g., the swipe sensor 600 or the press sensor 650) may be implemented under the glass or under the display of a device.

In one embodiment, a remote controller unit (e.g., the RCU 101, 400, or 510) is provided. The RCU may include a navigation keypad area (e.g., the navigation keypad area 120 or 410) that includes one or more navigation keys. The one or more navigation keys may be configured to move a cursor on a display device (e.g., the TV 102) associated to a computing device (e.g., the STB 103) or select one or more UI items displayed on the display device. In one embodiment, the display device and the computing device may form a single device (e.g., a smart TV). The RCU may include a fingerprint input component (e.g., the fingerprint sensor 408) arranged in the navigation keypad area. The fingerprint input component may be configured to capture a plurality of fingerprint frames of a user in response to the navigation keypad area being touched by the user to move the cursor or select the one or more UI items on the display device. In one embodiment, the one or more navigation keys may be touched by the user through pressing or swiping of user finger.

In one embodiment, the fingerprint input component may be a fingerprint input transducer or sensor (e.g., the fingerprint sensor 408 or 518). In one embodiment, the fingerprint input transducer or sensor may include a swipe sensor (e.g., the swipe sensor 600) or a press sensor (e.g., the press sensor 650). In one embodiment, the fingerprint input component may be placed under a surface area of the remote controller unit corresponding to the navigation keypad area. In one embodiment, the one or more navigation keys may be displayed on a touch screen of the remote controller unit and the navigation keypad area may be a portion of the touch screen.

In one embodiment, the RCU may further include a radio frequency transceiver (e.g., the RF transceiver 512) configured to transmit the plurality of fingerprint frames to a mobile device (e.g., the mobile device 105) of the user or a computing device (e.g., the STB 103 or 520) associated with the display device. In one embodiment, the computing device may be a smart television or a set-top box. In one embodiment, the radio frequency transceiver may be further configured to receive an identity information of the user from the mobile device. In one embodiment, the RCU may further include at least one processor configured to extract a plurality of fingerprint features from the plurality of fingerprint frames.

Figure 7:
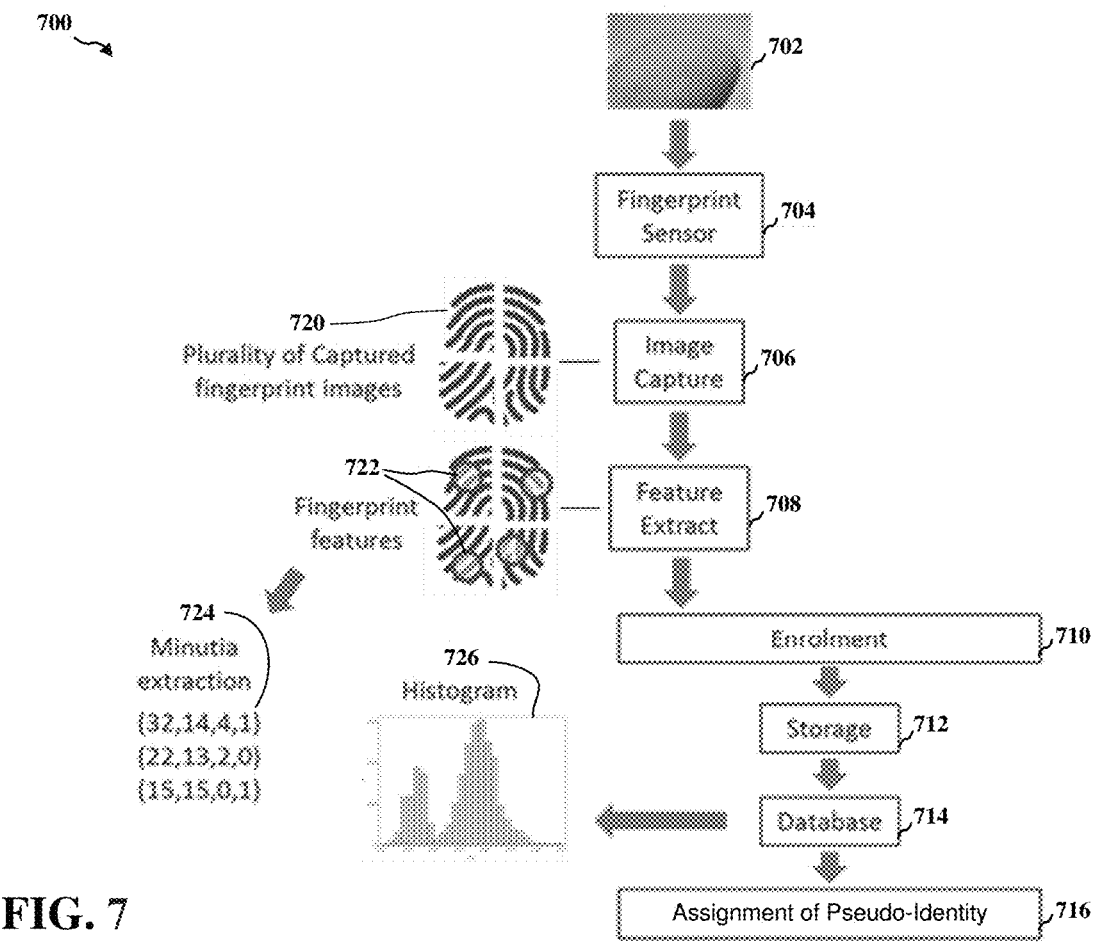
FIG. 7 is a diagram illustrating an example of the flow of capturing and processing fingerprint images.

FIG. 7 is a diagram 700 illustrating an example of the flow of capturing and processing fingerprint images. In one embodiment, a finger 702 may be placed on a finger sensor 704. The device (e.g., the RCU 101, 400, or 510) containing the fingerprint sensor 704 may capture (at 706) a plurality of fingerprint frames 720 and send the fingerprint frames 720 to a host (e.g., the STB 103). The subsequent fingerprint processing such as feature extraction (at 708), enrolment and assignment (at 710) and template storage (at 712) may reside in the host, as part of a fingerprint processing application (e.g., the fingerprint processing application 526). This may allow the RCU (e.g., the RCU 101, 400, or 510) to continue use cost effective processor while complex fingerprint processing and algorithm to be handled by the host, which usually has higher processing power and larger memory footprint.

In another embodiment, the image capturing (at 706) and feature extraction (at 708) may be done within the device (e.g., the RCU 101, 400, or 510) containing the fingerprint sensor 704 with embedded processor. Image enhancement and binarization may be included as image enhancement pre-processing before feature extraction (at 708).

In fingerprint feature extraction (at 708), minutiae based approach may be used to extract. Minutiae is the unique, measurable physical point at which a ridge bifurcates or ends.

In the enrolment process (at 710), a plurality of fingerprint feature extractions 722 or minutia points 724 may be stored during the user's session in browsing and watching the contents from the host (e.g., the STB 103 or 520). At the end of a session, the plurality of fingerprint feature extractions 722 or minutia points 724 may be stored and labelled accordingly in a storage 712, either locally on the host (e.g., the STB 103 or 520) or uploaded to a cloud storage (e.g., the cloud based server 104). The capturing of fingerprint frames continue for a long period, for instance, 30 days.

The data collected over time may form a database 714 and histogram 726. A few effective fingerprint frames or minutia points may be selected to form the registered templates. The data may then be assigned to a pseudo identity (at 716), e.g. User 1, so there is no need to require a user to knowingly register him/herself.

From the histogram 726, there may exist one or more minutia points with higher distributions indicating one or more unique fingers, or users. These higher distribution minutia points may be assigned to individual pseudo identity, e.g. User 1, User 2 and so on.

Figure 8:
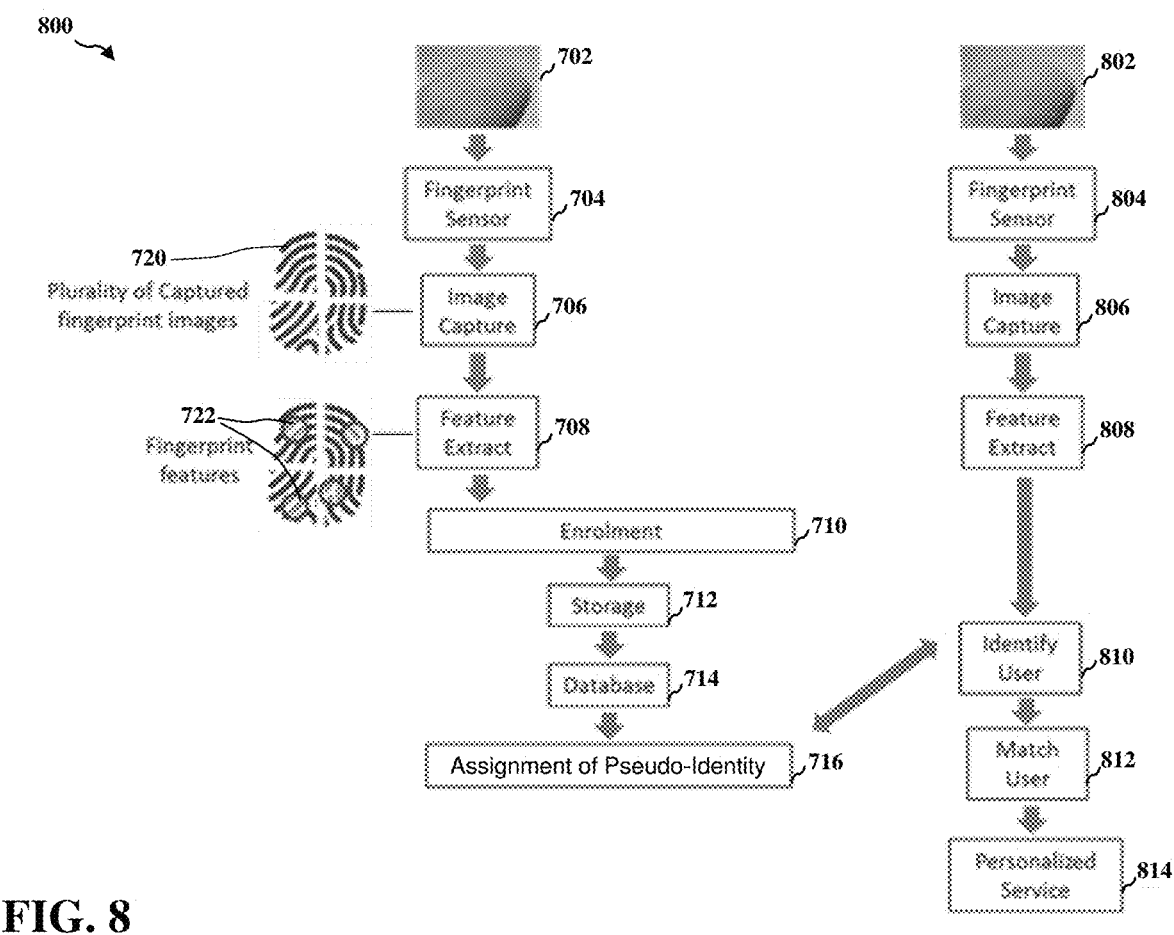
FIG. 8 is a diagram illustrating an example of the flow of utilizing the registered templates to provide personalized services.

FIG. 8 is a diagram 800 illustrating an example of the flow of utilizing the registered templates to provide personalized services. In one embodiment, a finger 802 may be placed on a finger sensor 804. The device (e.g., the RCU 101, 400, or 510) containing the fingerprint sensor 804 may capture (at 806) a plurality of fingerprint frames and send the fingerprint frames to a host (e.g., the STB 103). The subsequent fingerprint processing such as feature extraction (at 808), user identification (at 810), user matching (at 812), and providing personalized services (at 814) may reside in the host, as part of a fingerprint processing application (e.g., the fingerprint processing application 526). This may allow the RCU (e.g., the RCU 101, 400, or 510) to continue use cost effective processor while complex fingerprint processing and algorithm to be handled by the host, which usually has higher processing power and larger memory footprint.

In another embodiment, the image capturing (at 806) and feature extraction (at 808) may be done within the device (e.g., the RCU 101, 400, or 510) containing the fingerprint sensor 804 with embedded processor.

In the background, during the identification stage (at 810), the fresh/query fingerprint frames captured at 806 may be used to compare and match (at 812) with the registered templates for User 1 first, and User 2 next if unmatched. If necessary, to match with other registered templates in the database 714, looking for the fingerprints coming from the same finger. If no match is found, the fresh/query fingerprint frames may be added to the database 714. If matched, meaningful services like targeted content, advertisement, may be provided (at 814).

Unlike typical fingerprint identification with stringent FAR (False Acceptance Rate) and FRR (False Rejection Rate), the matching at 812 may be less stringent and done together with content information. The objective is to collect, compare, analyze fingerprint frames over longer period to enable the system to profile and assign to different pseudo identities.

In one embodiment, beside the fingerprint features, additional information may be used to better identifying the user. For example, information such as user's identity and/or content being watched, may be used to better identifying the user.

Figure 9:
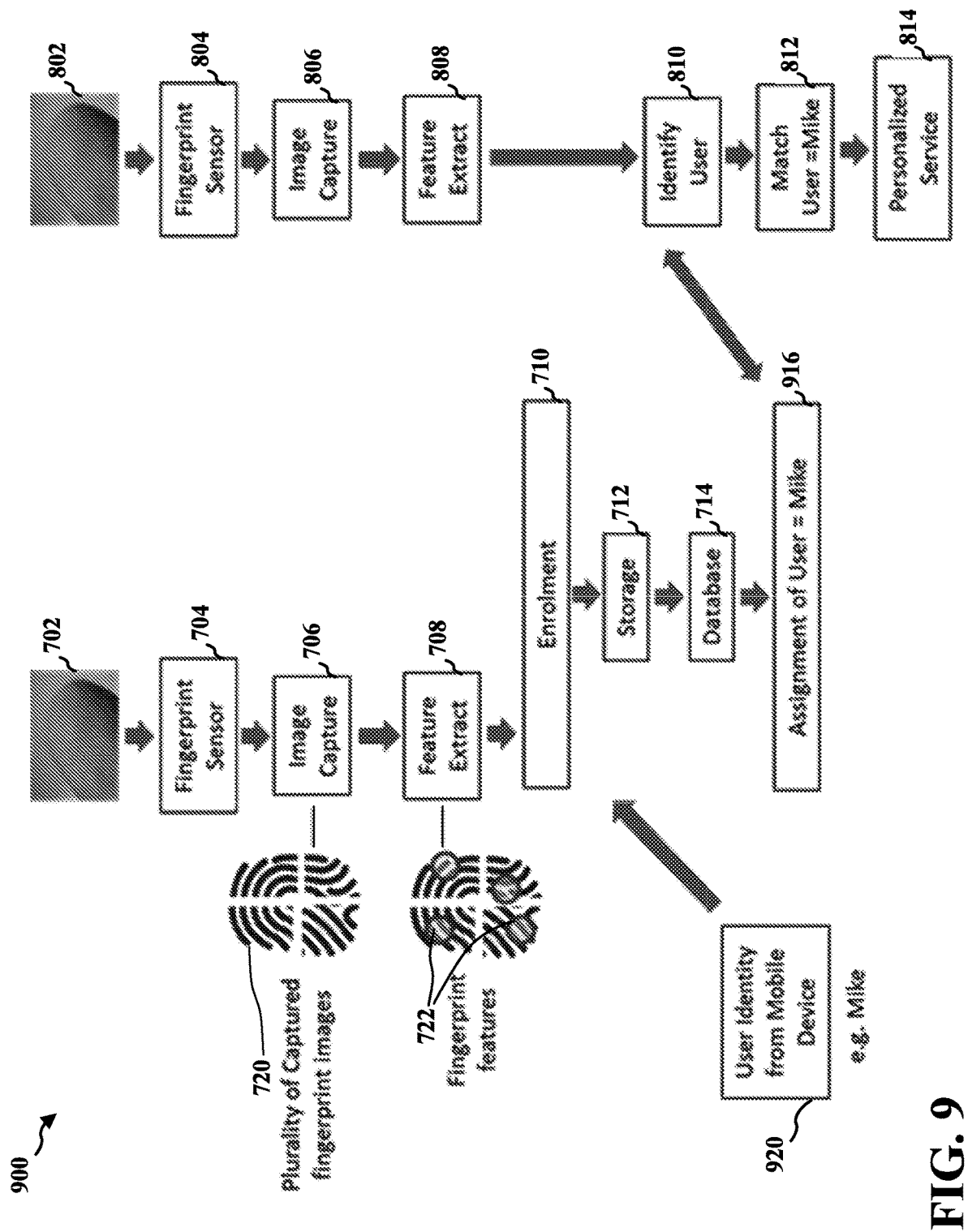
FIG. 9 is a diagram illustrating an example of the flow of using additional information besides the fingerprint features to better identifying a user.

FIG. 9 is a diagram 900 illustrating an example of the flow of using additional information besides the fingerprint features to better identifying a user. In one embodiment, a user's identity may be used during the enrolment process (at 710). The corresponding software in the RCU (e.g., the RCU 101, 400, or 510) may scan the broadcasted RF signature from a mobile device (e.g., the mobile device 105 or 306) and extract the user's identity 920.

With user identity 920 extracted, this identity 920 may be used to complement the enrolment process (at 710). This may simplify the identification of user using the RCU (e.g., the RCU 101, 400, or 510). Instead of pseudo identity, the user identity 920 may be assigned (at 916) to the fingerprints features or the registered templates.

In one embodiment, the fingerprint processing may reside in a mobile device (e.g., the mobile device 105 or 306). Similar to STB, mobile device may have relative powerful processor and larger memory compared to RCU's processor. The captured fingerprint images may be sent to the mobile device for processing. The mobile device may have application software that gets the identity of the user. The user identity may be assigned to or associated with the fingerprints of the user.

Even though an RCU is described above for using built-in fingerprint sensor in the navigation keypad area to achieve user recognition without needing the user to perform any intentional step, one of ordinary skill in the art would recognize that any handheld device may implement the features described above. One of ordinary skill in the art would also recognize that the fingerprint sensor may be arranged in any area of the device that may be frequently touched by user fingers. The user recognition may be used to provide personalized services, e.g., content recommendation, targeted advertisement, personal settings or GUI, private content, and application unlocking. In one embodiment, the features describe above may be implemented in RCUs specifically designed for elderly persons or kids, thus improving user experience.

Figures 10A, 10B:
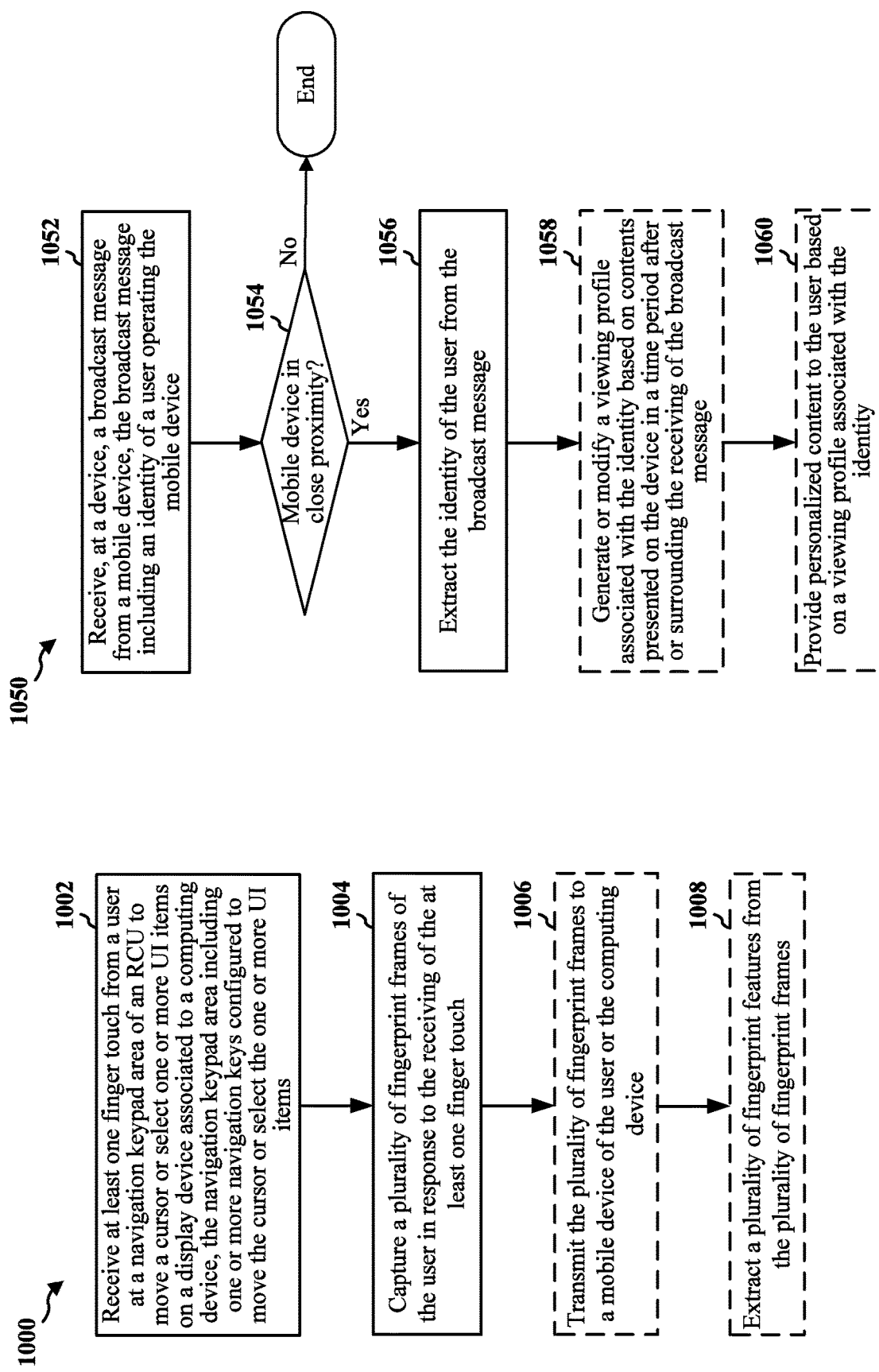
FIG. 10A is a flowchart of a method of user recognition.
FIG. 10B is a flowchart of another method of user recognition.

FIG. 10A is a flowchart 1000 of a method of user recognition. The method may be performed by an apparatus. In one embodiment, the apparatus may include an RCU (e.g., the RCU 101, 400, 510, or the apparatus 1102/1102'). In one embodiment, the apparatus may include one or more of an RCU, an STB, a mobile device, or a cloud-based server. In one embodiment, the operations performed in the method may be the operations described above with reference to FIGS. 7-9.

At 1002, the apparatus may receive at least one finger touch from a user at a navigation keypad area of a remote controller unit to move a cursor on a display device associated to a computing device or select one or more UI items on the display device. The navigation keypad area may include one or more navigation keys. The one or more navigation keys may be configured to move the cursor or select the one or more UI items on the display device. In one embodiment, the one or more navigation keys may be displayed on a touch screen of the remote controller unit and the navigation keypad area may be a portion of the touch screen. In one embodiment, the at least one finger touch may include at least one press of user finger. In one embodiment, the at least one finger touch may include at least one swipe of user finger.

At 1004, the apparatus may capture a plurality of fingerprint frames of the user in response to the receiving of the at least one finger touch. In one embodiment, the plurality of fingerprint frames may be captured by a fingerprint input transducer or sensor. In one embodiment, the fingerprint input transducer or sensor may include a swipe sensor or a press sensor. In one embodiment, the fingerprint input transducer or sensor may be placed under a surface area of the remote controller unit corresponding to the navigation keypad area. In one embodiment, a swipe sensor may be placed in between the navigation keys to capture the plurality of fingerprint frames during swipe actions involved in the at least one finger touch when user moves his finger across the navigation keys. In one embodiment, a press sensor may be placed on the OK/ENTER button to capture the plurality of finger frames when the OK/ENTER button is pressed.

At 1006, the apparatus may optionally transmit the plurality of fingerprint frames to a mobile device of the user or the computing device. In one embodiment, the computing device may be a smart television or a set-top box. In one embodiment, the apparatus may optionally receive identity information of the user from a mobile device.

At 1008, the apparatus may optionally extract a plurality of fingerprint features from the plurality of fingerprint frames. In one embodiment, the apparatus may associate the plurality of fingerprint features with an identity, and generate a viewing profile associated with the identity based on contents presented on the computing device in a time period after or surrounding the receiving of the at least one finger touch. In one embodiment, the apparatus may determine an identity of the user based on the plurality of fingerprint features, and provide personalized content to the user based on a viewing profile associated with the identity. In one embodiment, the apparatus may determine an identity of the user based on the plurality of fingerprint features, and modify a viewing profile associated with the identity based on contents presented on the computing device in a time period after or surrounding the receiving of the at least one finger touch.

In one embodiment, the apparatus may search for a viewing profile that is associated with the identity. If no matching viewing profile is found, the apparatus may generate a new viewing profile to be associated with the identity. If a viewing profile associated with the identity is found, the apparatus may modify or update the viewing profile. In one embodiment, the apparatus may search for a viewing profile that is associated with the identity, and provide personalized content based on the viewing profile.

FIG. 10B is a flowchart 1050 of another method of user recognition. The method may be performed by an apparatus. In one embodiment, the apparatus may include an RCU (e.g., the RCU 101, 400, 510, or the apparatus 1102/1102'). In one embodiment, the apparatus may include an STB (e.g., the STB 103 or 520). In one embodiment, the apparatus may include one or more of an RCU, an STB, or a cloud-based server. In one embodiment, the operations performed in the method may be the operations described above with reference to FIG. 2.

At 1052, the apparatus may receive a broadcast message from a mobile device. The broadcast message may include an identity of the user operating the mobile device. In one embodiment, the broadcast message may include an RF signature (e.g., device name and user's identity) of the mobile device.

At 1054, the apparatus may determine whether the mobile device is in close proximity to the apparatus. If the mobile device is in close proximity, the apparatus may proceed to 1056. Otherwise, the apparatus may terminate the method.

In one embodiment, to determine whether the mobile device is in close proximity, the apparatus may measure a signal strength of the received broadcast message from the mobile device, and determine whether the mobile device is in close proximity based on the measured signal strength. In one embodiment, the mobile device may be determined to be in close proximity to the apparatus when the measured signal strength is greater than a threshold. In one embodiment, the measured signal strength may include the received signal strength indication (RSSI).

At 1056, the apparatus may extract the identity of the user from the broadcast message. In one embodiment, the apparatus may decode the broadcast message to obtain the user identity.

At 1058, the apparatus may optionally generate or modify a viewing profile associated with the identity based on contents presented on the apparatus in a time period after or surrounding the receiving of the broadcast message. In one embodiment, the apparatus may search for a viewing profile that is associated with the identity. If no matching viewing profile is found, the apparatus may generate a new viewing profile to be associated with the identity. If a viewing profile associated with the identity is found, the apparatus may modify or update the viewing profile.

At 1060, the apparatus may optionally provide personalized content to the user based on a viewing profile associated with the identity. In one embodiment, the apparatus may search for a viewing profile that is associated with the identity, and provide personalized content based on the viewing profile. The viewing profile may be generated or modified at 1058.

Figure 11:
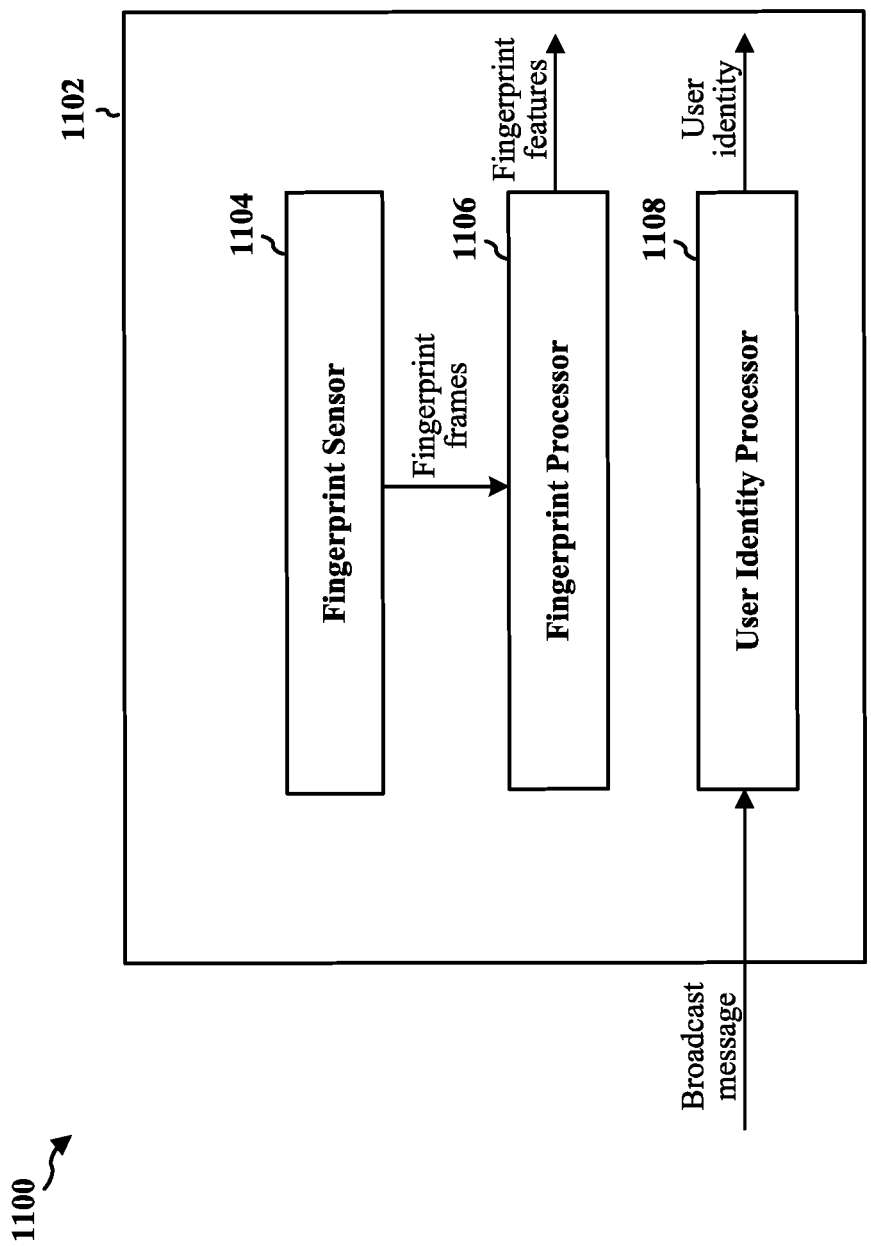
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus 1102 may be an RCU (e.g., the RCU 101, 400, or 510). The apparatus 1102 may include a fingerprint sensor 1104 that is configured to capture a plurality of fingerprint frames. In one embodiment, the fingerprint sensor 1104 may perform the operations described above with reference to 1004 in FIG. 10A.

The apparatus 1102 may include a fingerprint processor 1106 that extracts a plurality of fingerprint features from the plurality of fingerprint frames received from the fingerprint sensor 1104. In one embodiment, the fingerprint processor 1106 may also generate or modify viewing profiles associated with users, retrieve a viewing profile based on a user identity, or provide personalized content based on the viewing profile. In one embodiment, the fingerprint processor 1106 may perform the operations described above with reference to 1008 in FIG. 10A.

The apparatus 1102 may include a user identity processor 1108 that extracts a user identity from a broadcast message received from a mobile device if the mobile device is in close proximity to the apparatus 1102. In one embodiment, the user identity processor 1108 may perform the operations described above with reference to 1052, 1054, or 1056 in FIG. 10B.

The apparatus 1102 may include additional components that perform each of the blocks of the algorithm in the aforementioned flowchart of FIGS. 10A, 10B. As such, each block in the aforementioned flowchart of FIGS. 10A, 10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
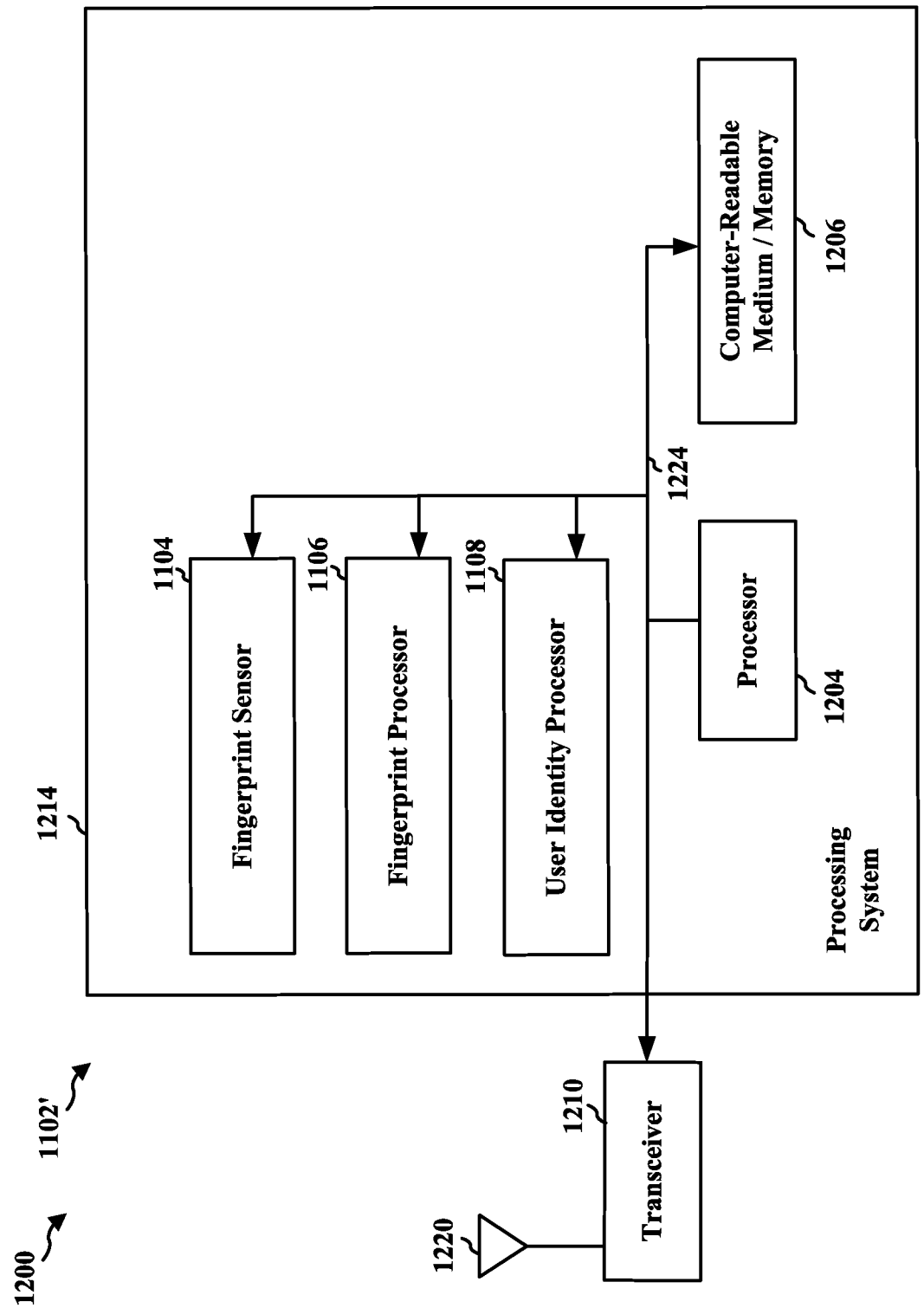
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214. In addition, the transceiver 1210 receives information from the processing system 1214, and based on the received information, generates a signal to be applied to the one or more antennas 1220.

The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1206, one or more hardware components coupled to the processor 1204, or some combination thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A user recognition system comprising:
a remote controller unit, associated with a TV system, having a navigation keypad area;
a fingerprint input component arranged in the navigation keypad area and configured to capture a first plurality of fingerprint frames of a user in response to the navigation keypad area being touched by the user; and
at least one processor, included in the TV system,
wherein the processor is configured to extract and store a plurality of fingerprint features comprising minutia points from the first plurality of fingerprint frames over a time period, and to form a registered template from the first plurality of fingerprint frames stored during a session of the user in browsing and watching content without the user performing any intentional registration step;
wherein the processor is further configured to use, without the user performing any intentional registration step, the first plurality of fingerprint frames to establish a pseudo-identity of the user based on the registered template,
wherein a profile associated with the pseudo-identity of the user is generated based on a usage of the TV system by the user over the time period after the navigation keypad area is touched by the user without needing the user to perform any intentional step,
wherein the processor is further configured to match a second plurality of fingerprint frames with the registered template based on the minutia points from a histogram of a database, wherein the processor is configured to match the second plurality of fingerprint frames with the registered template without relying on False Acceptance Rate and/or False Rejection Rate, and wherein the processor is configured to match the second plurality of fingerprint frames with the registered template based on the usage of the TV system by the user over the time period, and
wherein in response to determining that the second plurality of fingerprint frames do not match with registered templates from the database, the processor is further configured to save minutia points of the second plurality of fingerprint frames to the database.

2. The user recognition system of claim 1, wherein the fingerprint input component is a fingerprint input transducer or input sensor.

3. The user recognition system of claim 2, wherein the fingerprint input transducer or input sensor comprises a swipe sensor or a press sensor.

4. The user recognition system of claim 1, wherein the fingerprint input component is arranged under the navigation keypad area and the navigation keypad area includes one or more navigation keys configured to move a cursor on a display device associated with the TV system.

5. The user recognition system of claim 1, wherein the remote controller unit further comprises a touch screen and the navigation keypad area is a portion of the touch screen.

6. The user recognition system of claim 1, wherein the TV system comprises at least one of a set-top box and a smart television,
wherein the remote control unit further comprises a radio frequency transceiver configured to transmit the first plurality of fingerprint frames or the second plurality of fingerprint frames to at least one of the set-top box and the smart television.

7. The user recognition system of claim 1, wherein the TV system comprises at least one of a connected smart television and a regular television with i) a connected set-top box or ii) an over-the-top content box.

8. A method of user recognition for a TV system, comprising:
receiving at least one finger touch from a user at a navigation keypad area of a remote controller unit associated with the TV system;
capturing a first plurality of fingerprint frames of the user in response to the receiving of the at least one finger touch during a session of the user's in browsing and watching content;
transmitting the first plurality of fingerprint frames to the TV system;
extracting and storing a plurality of fingerprint features comprising minutia points from the first plurality of fingerprint frames over a time period;
forming a registered template from the first plurality of fingerprint frames stored without the user performing any intentional registration step;
establishing, without needing the user to perform any intentional registration step, a pseudo-identity of the user based on the registered template formed from the first plurality of fingerprint frames stored during the session of the user's in browsing and watching content;
generating, without needing the user to perform any intentional registration step, a profile associated with the pseudo-identity of the user based on a usage of the TV system by the user over the time period after the receiving of the at least one finger touch;
matching a second plurality of fingerprint frames with the registered template based on the minutia points from a histogram of a database wherein the matching is carried out without relying on False Acceptance Rate and/or False Rejection Rate, wherein the matching is further based on the usage of the TV system by the user over the time period; and
in response to determining that the second plurality of fingerprint frames do not match with registered templates from the database, saving minutia points of the second plurality of fingerprint frames to the database.

9. The method of claim 8, further comprising capturing the first plurality of fingerprint frames or the second plurality of fingerprint frames using a fingerprint input transducer or sensor.

10. The method of claim 8, further comprising receiving identity information of the user from a smart phone.

11. The method of claim 8, further comprising:
providing at least one of personalized content, targeted advertisement, or recommendation to the user based on the profile associated with the pseudo-identity.

12. A method of user recognition for a TV system, comprising:

receiving, at the TV system, a first broadcast message from a first smart phone, the first broadcast message comprising a first identity of a first user operating the first smart phone;

receiving at least one finger touch from the first user at a navigation keypad area of a remote controller unit associated with the TV system;

capturing, without needing the first user to perform any intentional registration step, a first plurality of fingerprint frames of the first user in response to the receiving of the at least one finger touch during a session of the first user in browsing and watching content;

extracting the first identity of the first user from the first broadcast message;

transmitting the first plurality of fingerprint frames to the TV system;

extracting and storing a plurality of fingerprint features comprising minutia points from the first plurality of fingerprint frames, forming, without the first user performing any intentional registration step, a registered template from the first plurality of fingerprint frames;

capturing via the remote controller unit, without needing the first user to perform any intentional registration step, a usage history of the first user for the registered template during the session of the first user in browsing and watching content;

generating a first profile for the first user, without needing the first user to perform any intentional registration step, based on the usage history of the first user;

providing at least one of customized content, targeted advertisement, or recommendation based on the first profile associated with the first identity;

matching a second plurality of fingerprint frames with the registered template based on the minutia points from a histogram of a database wherein the matching is carried out without relying on False Acceptance Rate and/or False Rejection Rate, wherein the matching is further based on the usage history; and in response to determining that the second plurality of fingerprint frames do not match with registered templates from the database, saving minutia points of the second plurality of fingerprint frames to the database.

13. The method of claim 12, further comprising:

receiving, at the TV system, a second broadcast message from a second smart phone when the second smart phone is in close proximity to the TV system and a signal threshold is reached, the second broadcast message comprising a second identity of a second user operating the second smart phone;

extracting the second identity of the second user from the second broadcast message; and providing at least one of customized content, targeted advertisement, or recommendation based on a combination of the first profile associated with the first identity and a second profile associated with the second identity, wherein the second profile is generated based on a usage history of the second user captured with the remote controller unit based on a registered template formed from a plurality of fingerprint frames stored during a session of the second user in browsing and watching content.

14. The user recognition system of claim 1, wherein at least one of personalized content, targeted advertisement, or recommendation is provided to the user based on the profile associated with the pseudo-identity.

15. The method of claim 13, further comprising:

using the fingerprint-sensing remote controller unit to generate the plurality of fingerprint frames for the second user transmitted to at least one of a set-top box and a smart television, wherein the TV system comprises at least one of the set-top box and the smart television.

16. The user recognition system of claim 1, wherein the usage of the TV system by the user includes content being watched by the user over the time period.

17. The method of claim 8, wherein the usage of the TV system by the user includes content being watched by the user over the time period.

18. The method of claim 12, wherein the usage history of the first user includes a history of browsing and watching the content during the session of the first user.

* * * * *